(12) United States Patent
Cavada et al.

(10) Patent No.: US 7,335,858 B2
(45) Date of Patent: *Feb. 26, 2008

(54) TOASTER USING INFRARED HEATING FOR REDUCED TOASTING TIME

(75) Inventors: Luis Cavada, Miami, FL (US); Charles Krasznai, Bridgeport, CT (US)

(73) Assignee: Applica Consumer Products, Inc., Miramar, FL (US)

( * ) Notice: Subject to any disclaimer, the term of this patent is extended or adjusted under 35 U.S.C. 154(b) by 591 days.

This patent is subject to a terminal disclaimer.

(21) Appl. No.: 10/742,504

(22) Filed: Dec. 18, 2003

(65) Prior Publication Data

US 2005/0132900 A1 Jun. 23, 2005

(51) Int. Cl.
*A21B 1/22* (2006.01)
*A47J 37/08* (2006.01)

(52) U.S. Cl. ............... 219/386; 219/411; 219/552; 392/408; 392/416; 392/418

(58) Field of Classification Search ............ None
See application file for complete search history.

(56) References Cited

U.S. PATENT DOCUMENTS

| | | | |
|---|---|---|---|
| 193,016 A | 7/1877 | McClave | |
| 1,090,607 A | 3/1914 | Fritz | |
| 1,281,991 A | 10/1918 | Menendez | |
| 3,472,153 A | * 10/1969 | Arntz | 99/329 R |
| 3,604,338 A | 9/1971 | Fiedler | 99/339 |
| 3,626,154 A | * 12/1971 | Reed | 219/411 |
| 3,646,879 A | 3/1972 | Palmason et al. | 99/339 |
| 3,663,798 A | 5/1972 | Speidel et al. | 219/464 |
| 3,668,371 A | 6/1972 | Fry et al. | 219/413 |

(Continued)

FOREIGN PATENT DOCUMENTS

JP 2000055376 A 2/2000

OTHER PUBLICATIONS

Appliance Heating Alloys, Kanthal Handbook, The Kanthal Corporation, pp. 4-38, 1997.

(Continued)

*Primary Examiner*—J. Pelham
(74) *Attorney, Agent, or Firm*—Baker Botts L.L.P.

(57) ABSTRACT

A toaster uses radiant heat at infrared wavelengths optimized for producing rapid and uniform toasting of a food product. The infrared wavelengths of the radiated heat are selected for optimum speed and quality (browning and moisture content) of the food product. The selected infrared wavelengths of the radiated heat may also effectively defrost a food product. Defrosting of the food product by the infrared radiated heat adds very little time in obtaining a desired toast color to the food product. A plurality of infrared wavelengths of radiated heat may also be used, wherein the plurality of infrared wavelengths are selected for optimal heat penetration and surface browning of the food product. Shorter wavelengths for browning and slightly longer wavelengths to penetrate the food product for evaporating the moisture therein to allow surface browning by the shorter wavelengths. In addition, the heating energy within the toaster may be further elongated (longer wavelengths) once the infrared radiation is re-radiated off of reflectors within the toaster. The wavelengths of infrared radiated heat may be from about 1 to about 3 microns, and preferably from about 1.96 to about 2.5 microns, and most preferably at about 2.11 microns.

22 Claims, 5 Drawing Sheets

U.S. PATENT DOCUMENTS

| | | | | |
|---|---|---|---|---|
| 3,736,860 | A | 6/1973 | Vischer, Jr. | 99/339 |
| 3,941,044 | A | 3/1976 | Goltsos | 99/391 |
| 4,093,841 | A | 6/1978 | Dills | 219/10.55 |
| 4,135,077 | A | 1/1979 | Wills | 219/121 |
| 4,345,143 | A | 8/1982 | Craig et al. | 219/411 |
| 4,392,594 | A | 7/1983 | Swett et al. | 222/530 |
| 4,421,015 | A | 12/1983 | Masters et al. | 99/332 |
| 4,441,002 | A | 4/1984 | Teich et al. | 219/10.55 |
| 4,481,404 | A | 11/1984 | Thomas et al. | 219/398 |
| 4,489,234 | A * | 12/1984 | Harnden et al. | 392/408 |
| 4,491,066 | A | 1/1985 | Juriga et al. | 99/391 |
| 4,504,176 | A | 3/1985 | Lindberg et al. | 405/271 |
| 4,516,486 | A | 5/1985 | Burkhart | 99/388 |
| 4,540,146 | A | 9/1985 | Basile | 248/201 |
| 4,551,616 | A | 11/1985 | Buttery | 219/460 |
| 4,554,437 | A | 11/1985 | Wagner et al. | 219/388 |
| 4,575,616 | A | 3/1986 | Bergendal | 219/405 |
| 4,577,092 | A | 3/1986 | Lenoir | 219/354 |
| 4,580,025 | A | 4/1986 | Carlson et al. | 219/10.55 |
| 4,602,143 | A | 7/1986 | Mack et al. | 219/225 |
| 4,664,923 | A | 5/1987 | Wagner et al. | 426/233 |
| 4,684,038 | A | 8/1987 | Gaul et al. | 222/89 |
| 4,728,777 | A | 3/1988 | Tsisios et al. | 219/348 |
| 4,761,529 | A | 8/1988 | Tsisios | 219/10.55 |
| 4,791,862 | A | 12/1988 | Hoffmann | 99/385 |
| 4,889,042 | A | 12/1989 | Hantz et al. | 99/340 |
| 4,960,977 | A * | 10/1990 | Alden | 219/388 |
| 4,965,434 | A * | 10/1990 | Nomura et al. | 392/407 |
| 4,972,768 | A | 11/1990 | Basora San Juan | 99/391 |
| 5,033,366 | A | 7/1991 | Sullivan | 99/352 |
| 5,036,179 | A | 7/1991 | Westerberg et al. | 219/411 |
| 5,126,534 | A | 6/1992 | Kwong | 219/386 |
| 5,157,239 | A | 10/1992 | Kanaya et al. | 219/411 |
| 5,181,455 | A | 1/1993 | Masel et al. | 99/391 |
| 5,189,946 | A | 3/1993 | Leon | 99/403 |
| 5,223,290 | A | 6/1993 | Alden | 426/243 |
| 5,237,913 | A | 8/1993 | Hahnewald et al. | 94/389 |
| 5,266,766 | A | 11/1993 | Hecox | 219/10.81 |
| 5,317,134 | A | 5/1994 | Edamura | 219/720 |
| 5,378,872 | A | 1/1995 | Jovanovic | 219/388 |
| 5,382,441 | A | 1/1995 | Lentz et al. | 426/241 |
| 5,390,588 | A | 2/1995 | Krasznai et al. | 99/389 |
| 5,400,697 | A * | 3/1995 | Dax et al. | 99/389 |
| 5,404,420 | A | 4/1995 | Song | 392/416 |
| 5,471,914 | A | 12/1995 | Krasznai et al. | 99/389 |
| 5,472,721 | A * | 12/1995 | Eisenberg et al. | 426/243 |
| 5,499,574 | A | 3/1996 | Esposito | 99/339 |
| 5,517,005 | A | 5/1996 | Westerberg et al. | 219/685 |
| 5,560,285 | A | 10/1996 | Moreth | 99/421 H |
| 5,590,584 | A | 1/1997 | Ahn | 99/327 |
| 5,647,270 | A | 7/1997 | Rousseau et al. | 99/327 |
| 5,653,158 | A | 8/1997 | Balandier et al. | 99/327 |
| 5,676,870 | A | 10/1997 | Wassman et al. | 219/400 |
| 5,692,432 | A | 12/1997 | Hazan et al. | 99/328 |
| 5,726,423 | A | 3/1998 | Westerberg et al. | 219/411 |
| 5,771,780 | A | 6/1998 | Basora et al. | 99/327 |
| 5,793,019 | A | 8/1998 | Boyle et al. | 219/400 |
| 5,809,994 | A | 9/1998 | Maher, Jr. | 126/374 |
| 5,823,099 | A | 10/1998 | Ko | 99/446 |
| 5,877,477 | A | 3/1999 | Petty et al. | 219/506 |
| 5,905,269 | A | 5/1999 | Venkataramani et al. | 250/504 R |
| 5,909,533 | A | 6/1999 | Kitabayashi et al. | 392/310 |
| 5,924,355 | A | 7/1999 | Belknap et al. | 99/389 |
| 5,944,224 | A | 8/1999 | Hodge et al. | 222/131 |
| 5,947,006 | A | 9/1999 | Mauffrey | 99/327 |
| 5,958,271 | A | 9/1999 | Westerberg et al. | 219/413 |
| 5,960,702 | A | 10/1999 | Thiriat et al. | 99/327 |
| 5,990,454 | A | 11/1999 | Westerberg et al. | 219/411 |
| 6,011,242 | A | 1/2000 | Westerberg | 219/411 |
| 6,013,900 | A | 1/2000 | Westerberg et al. | 219/405 |
| 6,013,908 | A | 1/2000 | Kume et al. | 219/719 |
| 6,018,146 | A | 1/2000 | Uzgiris et al. | 219/405 |
| 6,057,528 | A | 5/2000 | Cook | 219/405 |
| 6,062,128 | A | 5/2000 | Borgward | 99/326 |
| 6,069,345 | A | 5/2000 | Westerberg | 219/411 |
| RE36,724 | E | 6/2000 | Westerberg et al. | 219/685 |
| 6,097,016 | A | 8/2000 | Hirata et al. | 219/720 |
| 6,146,677 | A | 11/2000 | Moreth | 426/505 |
| 6,172,347 | B1 | 1/2001 | Lee | 219/685 |
| 6,201,217 | B1 | 3/2001 | Moon et al. | 219/386 |
| 6,229,117 | B1 | 5/2001 | Lenahan | 219/411 |
| 6,250,210 | B1 | 6/2001 | Moreth | 99/331 |
| 6,294,769 | B1 | 9/2001 | McCarter | 219/544 |
| 6,297,481 | B1 | 10/2001 | Gordon | 219/406 |
| 6,297,485 | B1 | 10/2001 | Kim et al. | 219/680 |
| 6,311,608 | B1 | 11/2001 | Hardin et al. | 99/326 |
| 6,316,757 | B1 | 11/2001 | Kim et al. | 219/680 |
| 6,320,165 | B1 | 11/2001 | Ovadia | 219/400 |
| 6,348,676 | B2 | 2/2002 | Kim et al. | 219/411 |
| 6,369,360 | B1 | 4/2002 | Cook | 219/388 |
| 6,382,084 | B1 | 5/2002 | Chan et al. | 99/327 |
| 6,405,640 | B1 | 6/2002 | Moreth | 99/334 |
| 6,408,842 | B1 | 6/2002 | Herrera | 126/41 C |
| 6,448,540 | B1 | 9/2002 | Braunisch et al. | 219/685 |
| 6,486,453 | B1 | 11/2002 | Bales et al. | 219/702 |
| 6,528,722 | B2 | 3/2003 | Huang et al. | 174/52.2 |
| 6,528,772 | B1 | 3/2003 | Graves et al. | 219/680 |
| 6,530,309 | B2 | 3/2003 | Van Der Meer et al. | 99/331 |
| 6,649,877 | B1 * | 11/2003 | Mauffrey et al. | 219/386 |
| 6,654,549 | B1 * | 11/2003 | Konishi | 392/407 |
| 6,670,586 | B2 | 12/2003 | Ingemanson et al. | 219/492 |
| 6,707,011 | B2 | 3/2004 | Tay et al. | 219/411 |
| 6,717,110 | B2 | 4/2004 | Van der Meer et al. | 219/386 |
| 6,755,120 | B1 | 6/2004 | Lin | 99/323.3 |
| 6,933,477 | B2 | 8/2005 | Becker et al. | 219/506 |
| 7,013,798 | B2 | 3/2006 | Arnedo et al. | 99/326 |
| 2002/0096984 | A1* | 7/2002 | Konishi et al. | 313/25 |
| 2002/0144995 | A1 | 10/2002 | Chun | 219/720 |
| 2002/0148824 | A1* | 10/2002 | Hauf et al. | 219/411 |
| 2003/0121904 | A1 | 7/2003 | Ingemanson et al. | 219/492 |
| 2004/0131493 | A1* | 7/2004 | Hattendorf et al. | 420/62 |
| 2004/0134900 | A1 | 7/2004 | Chun | 219/702 |
| 2005/0136785 | A1* | 6/2005 | Konishi et al. | 445/27 |
| 2005/0173400 | A1 | 8/2005 | Cavada et al. | 219/411 |
| 2005/0218139 | A1 | 10/2005 | Cavada et al. | 219/720 |

OTHER PUBLICATIONS

New High Temperature Quartz Heater Provides Efficiency, Economy, Watlow Electric Manufacturing Company, 3 pages, 2001.

Toaster Oven Instruction Manuel, www.krups.com, Krups USA 196 Boston Ave., Medford, MA 02155, 16 pages.

* cited by examiner

TOASTER USING INFRARED HEATING FOR REDUCED TOASTING TIME

BACKGROUND OF THE INVENTION TECHNOLOGY

1. Field of the Invention

The present invention relates to electric toasters, and more specifically, to an infrared heated electric toaster having reduced toasting time and improved browning consistency.

2. Background of the Related Technology

Toasting of food products, e.g., breads and pastries, requires that moisture be removed therefrom so that the surface of the food product will turn brown upon further application of heat thereto. This has generally required several minutes of time for a food product that is relatively fresh (high moisture content). Over the years there have been many attempts at finding ways to speed up toasting of food products. Toaster appliances employing various technologies, e.g., calrods, mica card heating elements, halogen high intensity light, and, in addition, higher power heating elements have been used, however, all have fallen short of consumer's expectations. With the toaster appliances used in the past, there were usually some tradeoffs made by the consumer in order to gain faster toasting speed. Consumers might comprise toasting quality, safety, etc., in favor of speed.

Therefore, a problem exists, and a solution is required for improving the speed and quality of toasting food products.

SUMMARY OF THE INVENTION

The present invention remedies the shortcomings of present toasting technologies by providing a toaster using radiant heat at infrared wavelengths optimized for producing rapid and uniform toasting of a food product. The infrared wavelengths of the radiated heat are selected for optimum speed and quality (browning and moisture content) of the food product. The selected infrared wavelengths of the radiated heat may also effectively defrost a food product. Defrosting of the food product by the infrared radiated heat adds very little time in obtaining a desired toast color to the food product. A typical food product toasting time for the present invention may be about one minute.

The invention may emit a plurality of infrared wavelengths of radiated heat, wherein the plurality of infrared wavelengths are selected for optimal heat penetration and surface browning of the food product, e.g., shorter wavelengths for browning and slightly longer wavelengths to penetrate the food product for evaporating the moisture therein to allow surface browning by the shorter wavelengths. In addition, the heating energy within the toaster may be further elongated (longer wavelengths) once the infrared radiation is re-radiated off of reflectors within the toaster. The wavelengths of infrared radiated heat may be from about 1 to about 3 microns, and preferably from about 1.96 to about 2.5 microns, and most preferably at about 2.11 microns.

According to exemplary embodiments of the invention, the infrared wavelength radiation emitting heaters may be cylindrical and may comprise any type of material that can be used for resistance heating and is capable of emitting heating energy at infrared wavelengths, e.g., metal alloy filament materials such as, for example but not limited to, Ni Fe, Ni Cr, Ni Cr Fe and Fe Cr Al, where the symbols: Ni represents nickel, Fe represents iron, Cr represents chromium, and Al represents aluminum. The infrared wavelength emitting filament material may either be exposed or preferably enclosed within a high temperature infrared wavelength transparent tube, such as for example, a high temperature quartz tube, e.g., 99.9 percent pure quartz ($SiO_2$), and may be clear, chemically etched, or have extruded grooves therein depending upon the desired infrared wavelength(s) to be emitted. The filament material may be heated by an electric current, alternating or direct, to a temperature sufficient for the emission of energy at a desired infrared wavelength(s). The infrared wavelength(s) emitted from the heater may be changed by changing the voltage applied to the filament material.

Some of the infrared wavelength energy may be directed toward the surface of the food product from heat reflectors located about or proximate, e.g., the infrared wavelength energy emitter (source) is located between the heat reflector and the food product being toasted. The heat reflectors may be designed so as to evenly distribute the infrared wavelength energy over the surface of the food product for consistent browning thereof. The emitted infrared wavelengths that are radiated directly onto the surface of the food product may be selected for optimal browning of the food product, and the infrared wavelength energy reflected by the heat reflectors may be at longer infrared wavelengths than the directly radiated infrared wavelength energy. The longer infrared wavelength energy will penetrate deeper into the food product to aid in removing moisture therefrom before surface browning occurs. The heat reflectors may be fabricated from aluminized steel, bright chrome plated metal and the like.

A gold coating, which is a very efficient reflector of infrared wavelengths, may also be placed over a portion of the quartz tube of the heater. This gold coating may be used to direct infrared wavelength energy as desired, e.g., toward the surface of the food product, and reduce the amount of infrared wavelength energy from the side of the quartz tube opposite the surface of the food product. Thus the gold coating will substantially reduce the infrared wavelength radiation in directions that are not useful for heating and browning of the food product. In addition, the gold coating helps reduce the temperature of surfaces behind the gold coating. By reducing infrared wavelength energy from surfaces not useful for toasting, e.g., facing toaster housing surfaces, the metallic housing of a toaster product may be cool to the touch. The gold coating may be of any thickness, preferably about one micron in thickness.

According to an exemplary embodiment of the invention, a toaster comprises a toasting chamber adapted to receive a food product, e.g., bread, pastries, bagels, English muffins, biscuits, waffles, etc., infrared wavelength emitting radiant heat sources located on either side of the toasting chamber, and heat reflectors proximate or adjacent to the infrared wavelength heat sources, the infrared wavelength heat sources advantageously being located between the toasting chamber and the reflectors. The toaster may have an ejector mechanism located at the bottom of the food product toasting chamber, the ejector adapted to expel the food product from the toasting chamber when toasting thereof is complete. An enclosure surrounds the food product toasting chamber, infrared wavelength heat sources and heat reflectors. Controls for the toaster may also be attached to the enclosure, and/or be an integral part thereof. The food product toasting chamber may be adapted to receive one or more items of the food product, e.g., slice(s) of bread.

It is contemplated and within the scope of the present invention that more than one food product toasting chamber may be provided in a toaster. Each of the toasting chambers may advantageously be independently controllable, e.g., different toasting settings for each chamber. Each of the more than one food product toasting chambers may have associated infrared wavelength heat sources on either side of the respective toasting chamber, and heat reflectors may be adjacent to each of these infrared wavelength heat sources, the infrared wavelength heat sources being located between the respective toasting chamber and the respective reflectors. It is also contemplated and within the scope of the invention that longer wavelength infrared radiant energy emitting heat sources and/or from the heat reflectors may be used to improve the rate of moisture evaporation of the food product so as to allow even faster surface browning thereof.

A technical advantage of the present invention is faster toasting of food products. Another technical advantage is more even browning of toasted food products. Still another technical advantage is faster and more even toasting of a variety of food products, e.g., different types of breads and pastries. Yet another advantage is good toast color shading on the surface while retaining a substantial portion of the moisture content of the food product. Still another technical advantage is defrosting and toasting of frozen food products. Still another technical advantage is uniform toast shades over non-uniform width food products. Yet another advantage is using longer infrared wavelengths in combination with the selected browning infrared wavelengths for improving the rate of moisture evaporation of the food product so as to allow even faster surface browning thereof. Other technical advantages should be apparent to one of ordinary skill in the art in view of what has been disclosed herein.

BRIEF DESCRIPTION OF THE DRAWINGS

A more complete understanding of the present disclosure and advantages thereof may be acquired by referring to the following description taken in conjunction with the accompanying drawings wherein.

Figure 1:
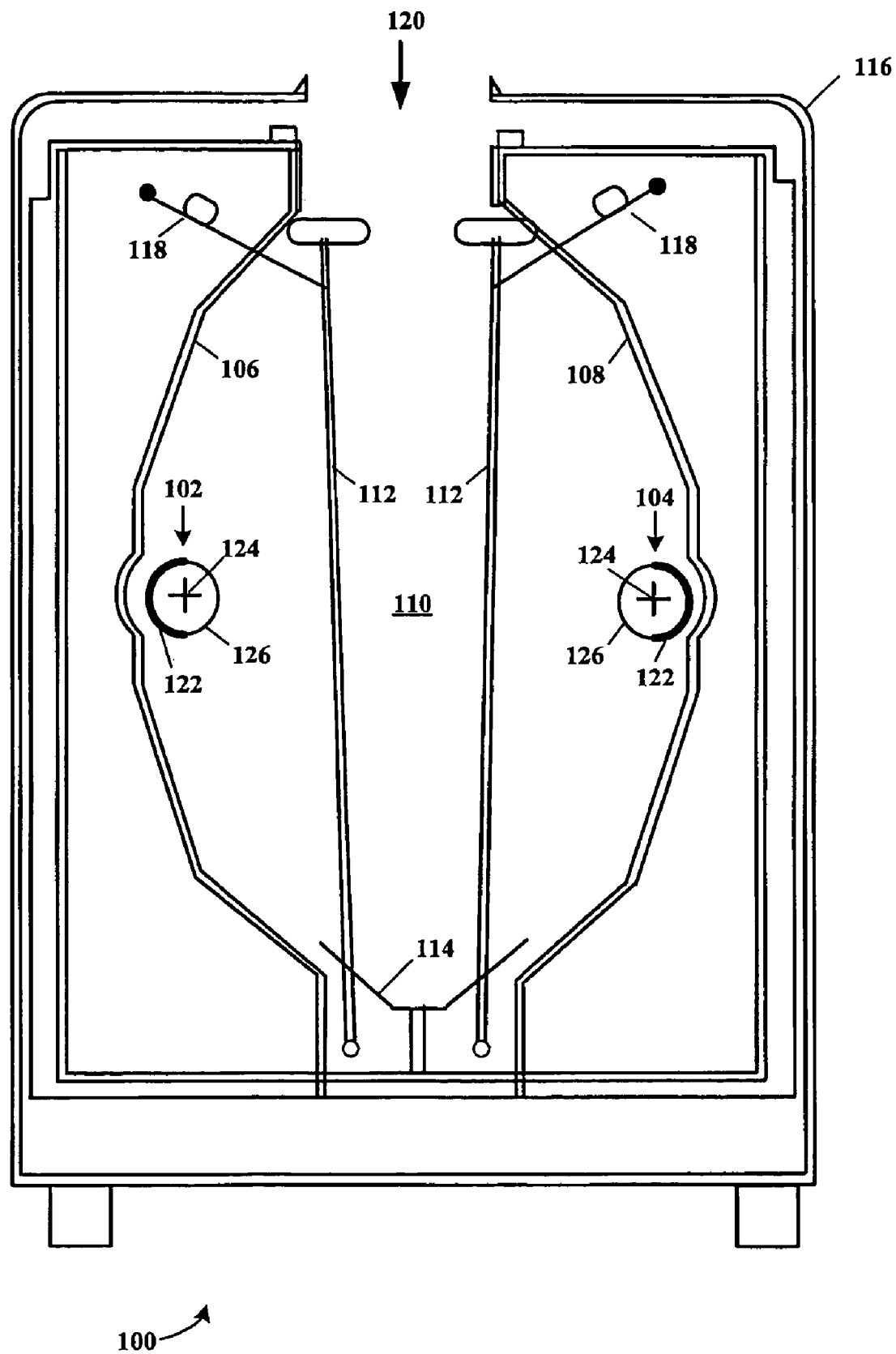
FIG. 1 is a schematic elevational view of a cutaway section of an infrared toaster, according to an exemplary embodiment of the present invention.

The present invention may be susceptible to various modifications and alternative forms. Specific exemplary embodiments thereof are shown by way of example in the drawing and are described herein in detail. It should be understood, however, that the description set forth herein of specific embodiments is not intended to limit the present invention to the particular forms disclosed. Rather, all modifications, alternatives, and equivalents falling within the spirit and scope of the invention as defined by the appended claims are intended to be covered.

DETAILED DESCRIPTION OF SPECIFIC EMBODIMENTS

Referring now to the drawings, the details of exemplary embodiments of the present invention are schematically illustrated. Like elements in the drawings will be represented by like numbers, and similar elements will be represented by like numbers with a different lower case letter suffix.

Referring now to FIG. 1, depicted is a schematic elevational view of a cutaway section of an infrared toaster, according to an exemplary embodiment of the present invention. The infrared toaster, generally represented by the numeral 100, comprises infrared wavelength emitting radiant heat sources (hereinafter IR heaters) 102 and 104, radiant heat reflectors 106 and 108, a toasting chamber 110 for a food product (not shown), food product centering guides 112, a food product ejector 114, and a toaster housing 116. The centering guides 112 may be outwardly biased with springs 118. The centering guides 112 may be wires and the like. The ejector 114 is adapted, in a first position, to support the food product (not shown) inside the toasting chamber 110 during toasting thereof, and to eject (push up), in a second position, the toasted food product from the toasting chamber 110.

The IR heaters 102 and 104 are positioned so as to emit infrared radiant heat directly onto the surface of the food product located in the toasting chamber 110. The reflectors 106 and 108 are shaped so as to reflect onto the food product in the toasting chamber 110, infrared radiant heat from the IR heaters 102 and 104. It is contemplated and within the scope of the invention that the IR heaters 102 and 104 may have any shape or form that advantageously directs infrared radiant heat into the food product in an even and uniform manner. The infrared radiant heat reflected from the reflectors 106 and 108 may be at a longer wavelength than the directly emitted infrared radiant heat from the IR heaters 102 and 104. This longer wavelength infrared radiant heat penetrates deeper into the food, thus shortening the moisture evaporation time of the food product before surface browning may occur. The wavelengths of infrared radiated heat may be from about 1 to about 3 microns, and preferably from about 1.96 to about 2.5 microns, and most preferably at about 2.11 microns.

The IR heaters 102 and 104 may be a filament 124 whereby electrical current is passed through the filament so as to heat the filament to a temperature at which a desired wavelength of infrared energy is radiated therefrom. The IR heaters 102 and 104 may radiate a plurality of wavelengths of infrared energy as well as wavelengths of visible light. Material for and electrical current through the IR heaters 102 and 104 are selected so that the heaters produce predominantly the desired infrared wavelength or wavelengths for toasting of the food product. The filaments 124 of the IR heaters 102 and 104 may be comprised of any type of material that can be used for resistance heating and is capable of emitting heating energy at infrared wavelengths, e.g., metal alloy filament materials such as, for example but not limited to, Ni Fe, Ni Cr, Ni Cr Fe and Fe Cr Al, where the symbols: Ni represents nickel, Fe represents iron, Cr represents chromium, and Al represents aluminum. The filament 124 may either be exposed or preferably enclosed within a high temperature infrared wavelength transparent tube, such as for example, a high temperature quartz tube 126. The quartz tube 126 may be clear, chemically etched, or have extruded grooves therein depending upon the desired infrared wavelength to be emitted therethrough. Electrical current through each filament 124 of the IR heaters 102 and 104 may preferably be about five amperes at about 120 volts, resulting in a power draw for each of the IR heaters 102 and 104 of about 600 watts. Thus, the toaster 100 may use a total of about 1200 watts of power which is well within the rating of a standard 15 or 20 ampere, 120 volt wall receptacle in a home or business, e.g., kitchen receptacle. It is contemplated and within the scope of the present invention that other operating voltages and currents may be used so long as the desired infrared wavelength(s) of radiant heat energy is produced.

The housing 116 may be metal and/or plastic. The housing 116 is open above the toasting chamber 110 so that the food product may be inserted into the toasting chamber 110 in a direction 120. Toasting controls 502 (see FIG. 5) for the toaster 100 may be located on the housing 116. A gold coating 122 may be applied to the quartz glass tubes 126 for reflecting the infrared wavelength energy away from the portions of the quartz glass tubes 126 that do not substantially contribute to the radiant heating and browning of the food product. The gold coating 122 will help in reducing the surface temperature of the housing 116. In addition, an air space between the housing 116 and the reflectors 106 and 108 also aid in reducing the surface temperature of the housing 116 during toasting of the food product.

Figure 2:
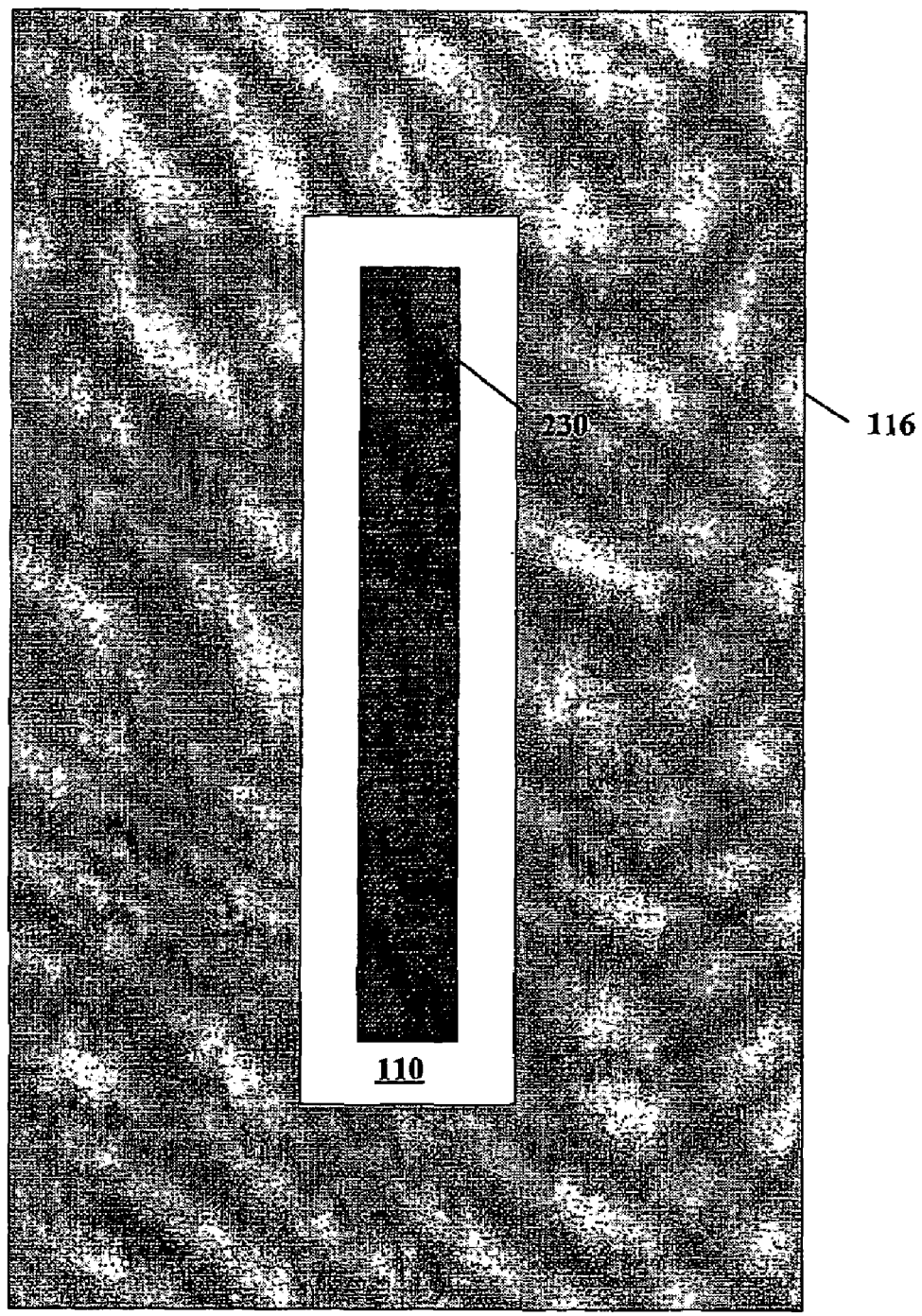
FIG. 2 is a schematic top view of the infrared toaster illustrated in FIG. 1.

Referring now to FIG. 2, depicted is a schematic top view of the infrared toaster illustrated in FIG. 1. The food product 230 is located in the toasting chamber 110. More than one piece of the food product 230 may be placed into the toasting chamber 110, depending upon the size thereof.

Figure 3:
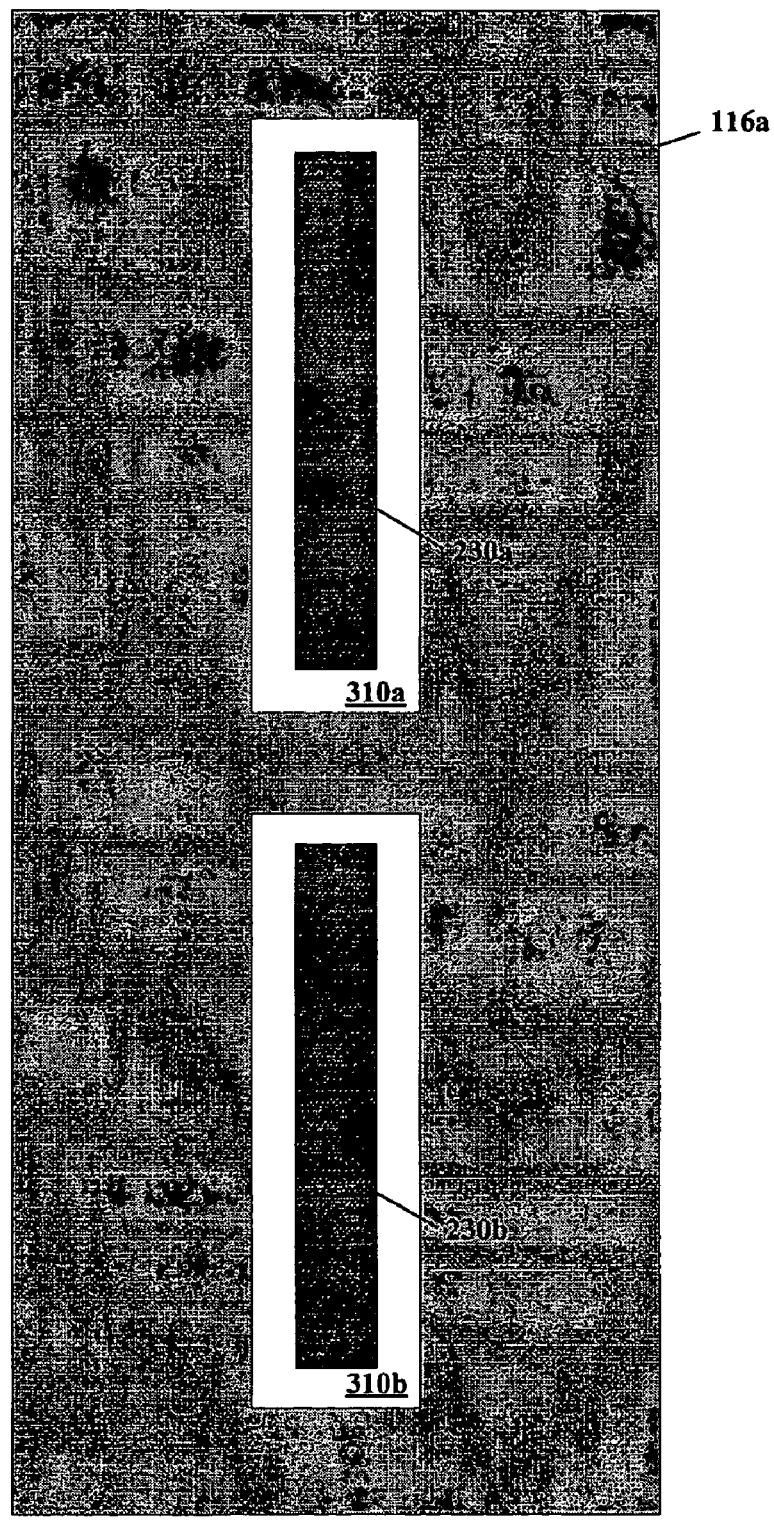
FIG. 3 is a schematic top view of an infrared toaster having greater capacity, according to another exemplary embodiment of the present invention.

Referring now to FIG. 3, depicted is a schematic top view of an infrared toaster having greater capacity, according to another exemplary embodiment of the present invention. The toaster 100a has at least two toasting chambers 310a and 310b into which food products 230a and 230b may be inserted, respectively. Either a single pair of IR heaters (e.g., 102 and 104 of FIG. 1) may be positioned on either side of the food products 230a and 230b, or individual pairs of IR heaters and reflectors may be used for each of the two toasting chambers 310a and 310b.

Figure 4:
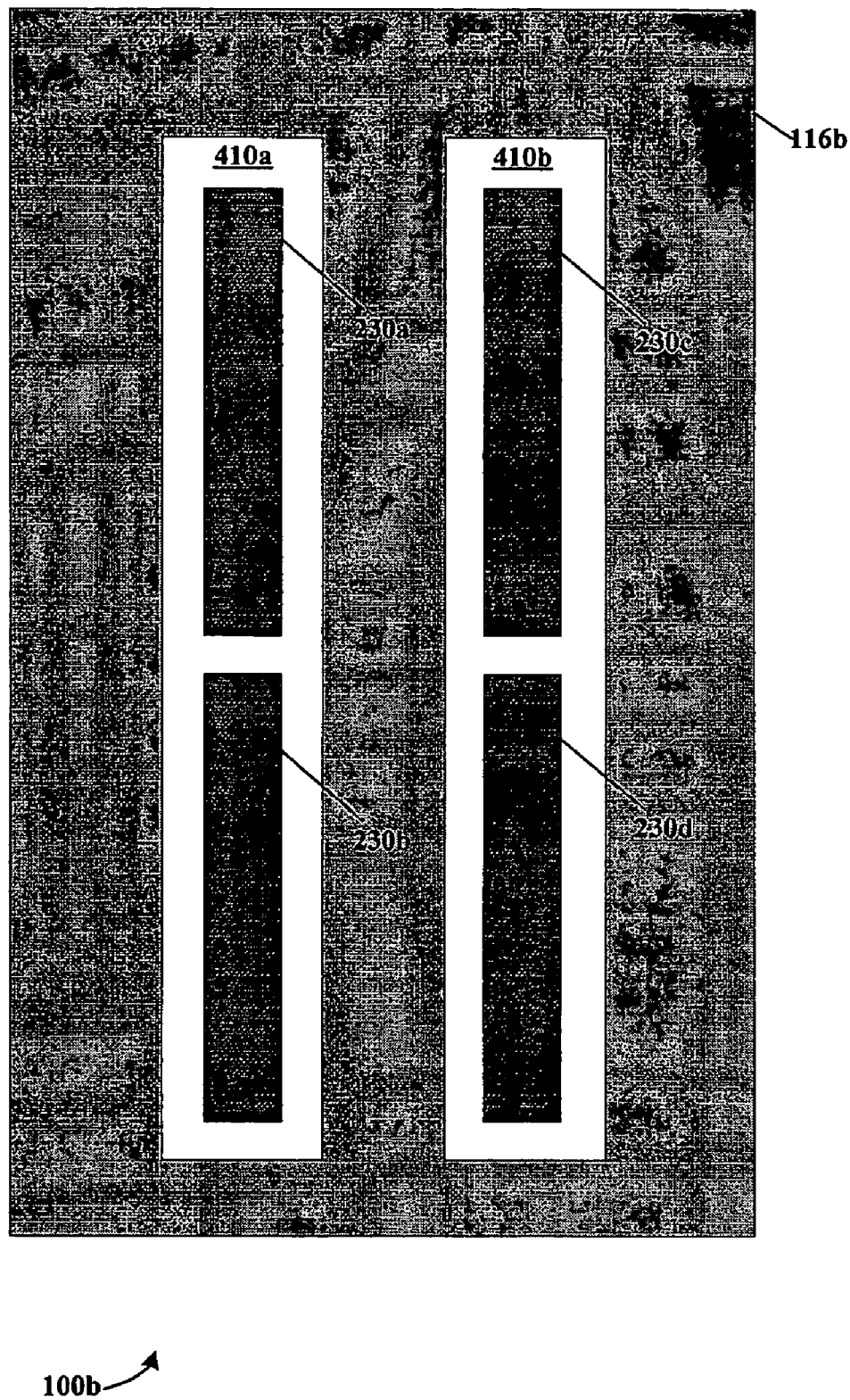
FIG. 4 is a schematic top view of an infrared toaster having even greater capacity, according to yet another exemplary embodiment of the present invention.

Referring now to FIG. 4, depicted is a schematic top view of an infrared toaster having even greater capacity, according to yet another exemplary embodiment of the present invention. The toaster 100b has at least two toasting chambers 410a and 410b into which a plurality of food products 230a-230b and 230c-230d may be inserted, respectively. Either a single pair of IR heaters (e.g., 102 and 104 of FIG. 1) for each of the toasting chambers 410a and 410b may be positioned on either side of the food products 230a-230b and 230c-230d, respectively, or individual pairs of IR heaters and reflectors may be used for each of the plurality of food products 230a-230c.

Figure 5:
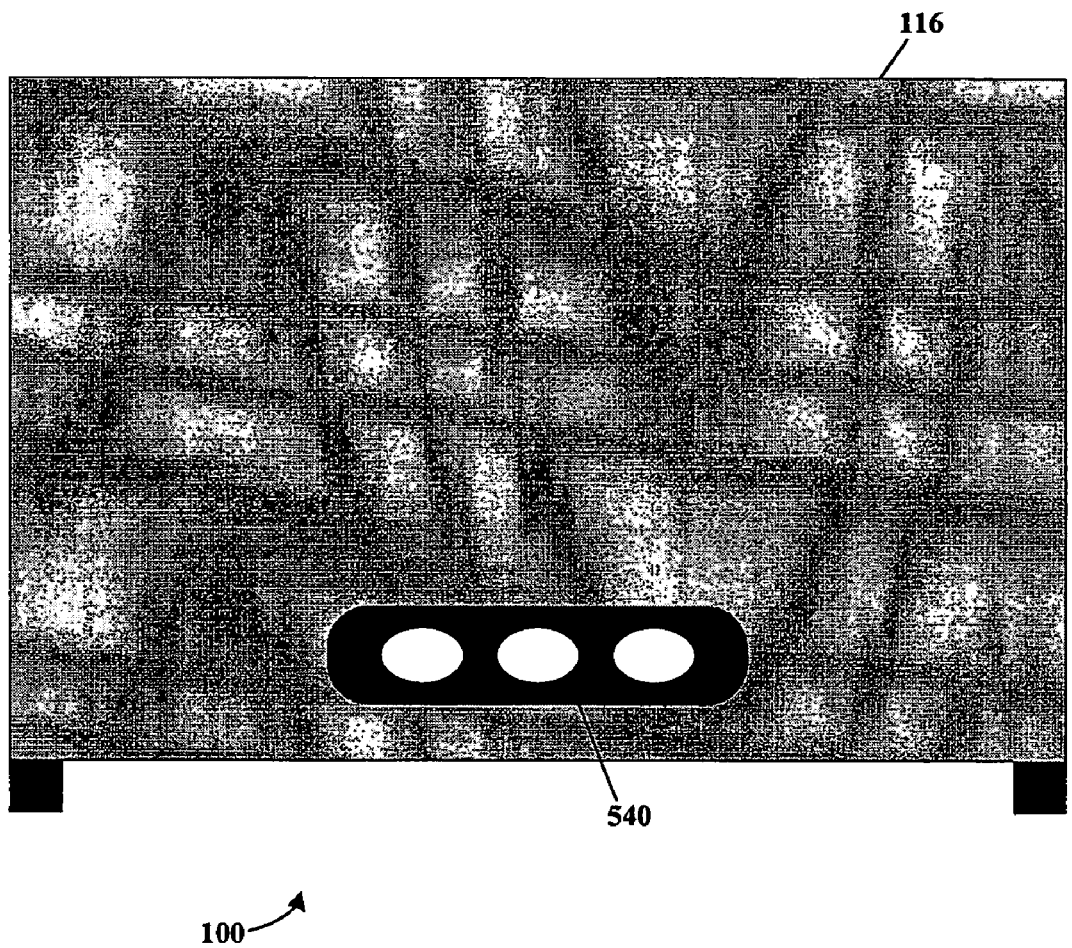
FIG. 5 is a schematic elevational view of the front controls of the infrared toaster, according to the exemplary embodiments of the present invention.

Referring now to FIG. 5, depicted is a schematic elevational view of the front controls of the infrared toaster, according to the exemplary embodiments of the present invention. A control panel 540 may be located anywhere on the housing 116 so long as the controls of the panel 540 are easy to use. The controls of the panel 540 may be used to set the desired toast color and the like. Also contemplated may be a control for causing the ejector 114 to manually ejecting the food product 230 from the toasting chamber 110.

The invention, therefore, is well adapted to carry out the objects and to attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alteration, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. An apparatus for toasting a food product, comprising:
   a toasting chamber adapted for receiving a food product to be toasted, the toasting chamber having first and second sides;
   a first infrared heater comprising a first electrically conductive filament inside of a first quartz glass tube, the first infrared heater being located on the first side of the toasting chamber;
   a second infrared heater comprising a second electrically conductive filament inside of a second quartz glass tube, the second infrared heater being located on the second side of the toasting chamber;
   a first radiant heat reflector located on the first side of the toasting chamber, wherein the first infrared heater is located between the toasting chamber and the first radiant heat reflector; and
   a second radiant heat reflector located on the second side of the toasting chamber, wherein the second infrared heater is located between the toasting chamber and the second radiant heat reflector;
   wherein the first and second quartz glass tubes are chemically etched so as to pass a desired infrared wavelength from the electrically conductive filament, and
   wherein the first and second infrared heaters emit infrared radiant heat at a wavelength optimized for toasting of the food product.

2. The apparatus of claim 1, wherein the toasting chamber has centering guides for positioning the food product between the first and second infrared heaters.

3. The apparatus of claim 2, wherein the centering guides are comprised of wires forming the first and second sides of the toasting chamber.

4. The apparatus of claim 2, wherein the centering guides are outwardly biased.

5. The apparatus of claim 1, wherein the first and second electrically conductive filaments are adapted to pass a desired amount of electric current therethrough.

6. The apparatus of claim 5, wherein the first and second electrically conductive filaments are comprised of a composition of nickel (Ni) and iron (Fe).

7. The apparatus of claim 5, wherein the first and second electrically conductive filaments are comprised of a composition of nickel (Ni) and chromium (Cr).

8. The apparatus of claim 5, wherein the first and second electrically conductive filaments are comprised of a composition of nickel (Ni), chromium (Cr) and iron (Fe).

9. The apparatus of claim 5, wherein the first and second electrically conductive filaments are comprised of a composition of iron (Fe), chromium (Cr) and aluminum (Al).

10. The apparatus of claim 1, wherein the quartz glass tube is clear.

11. The apparatus of claim 1, wherein the first and second radiant heat reflectors reflect radiant heat from the first and second infrared heaters onto the food product surfaces facing the first and second sides, respectively, of the toasting chamber.

12. The apparatus of claim 11, wherein the first and second radiant heat reflectors are optimized to evenly distribute radiant heat onto surfaces of the food product.

13. The apparatus of claim 1, wherein the infrared wavelength is from about 1 to about 3 microns.

14. The apparatus of claim 1, wherein the infrared wavelength is from about 1.96 to about 2.5 microns.

15. The apparatus of claim 1, wherein the infrared wavelength is about 2.11 microns.

16. The apparatus of claim 1, wherein the infrared wavelength comprises a plurality of infrared wavelengths optimized for toasting of the food product.

17. The apparatus of claim 11, wherein the reflected radiant heat is at a longer infrared wavelength than the infrared wavelength of the radiant heat from the first and second infrared heaters.

18. The apparatus of claim 1, further comprising a gold coating over a portion of each of the first and second quartz glass tubes, wherein the gold coated portion is on the distal side of each quartz glass tube from the food product.

19. The apparatus of claim 1, further comprising a food product ejector having a first position and a second position, wherein when in the first position the food product is positioned inside the toasting chamber and when in the second position the food product is ejected from the toasting chamber.

20. The apparatus of claim 1, further comprising a housing, wherein the housing encloses the toasting chamber, the first and second infrared heaters, and the first and second radiant heater reflectors.

21. The apparatus of claim 20, further comprising toasting controls located on the housing.

22. An apparatus for toasting a food product, comprising:
a toasting chamber adapted for receiving a food product to be toasted, the toasting chamber having first and second sides;

a first infrared heater comprising a first electrically conductive filament inside of a first quartz glass tube, the first infrared heater being located on the first side of the toasting chamber;

a second infrared heater comprising a second electrically conductive filament inside of a second quartz glass tube, the second infrared heater being located on the second side of the toasting chamber;

a first radiant heat reflector located on the first side of the toasting chamber, wherein the first infrared heater is located between the toasting chamber and the first radiant heat reflector; and a second radiant heat reflector located on the second side of the toasting chamber, wherein the second infrared heater is located between the toasting chamber and the second radiant heat reflector;

wherein the first and second quartz glass tubes have extruded grooves therein so as to pass a desired infrared wavelength from the electrically conductive filament and wherein the first and second infrared heaters emit infrared radiant heat at a wavelength optimized for toasting of the food product.

* * * * *

UNITED STATES PATENT AND TRADEMARK OFFICE
CERTIFICATE OF CORRECTION

| | | |
|---|---|---|
| PATENT NO. | : 7,335,858 B2 | Page 1 of 1 |
| APPLICATION NO. | : 10/742504 | |
| DATED | : February 26, 2008 | |
| INVENTOR(S) | : Luis Cavada and Charles Krasznai | |

It is certified that error appears in the above-identified patent and that said Letters Patent is hereby corrected as shown below:

Col. 6, Line 54 - 55 should read:

10.    The apparatus of claim 1, wherein the quartz glass tubes [[is]] are clear.

Signed and Sealed this

Seventeenth Day of March, 2009

JOHN DOLL
*Acting Director of the United States Patent and Trademark Office*